Patented July 15, 1924.

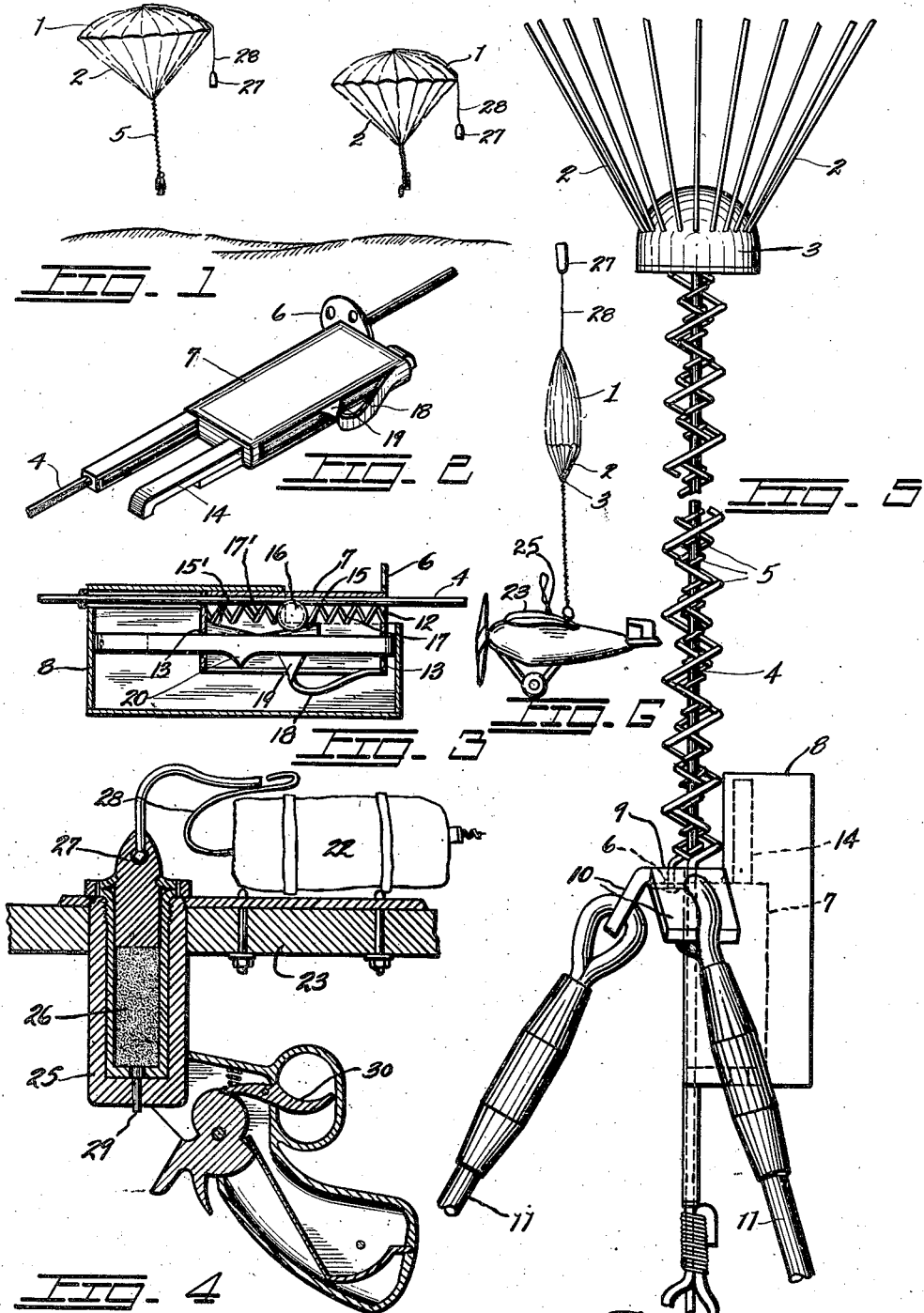

1,501,431

UNITED STATES PATENT OFFICE.

FRANK E. BEST, OF SEATTLE, WASHINGTON.

PARACHUTE AND MEANS FOR LAUNCHING SAME.

Application filed December 28, 1921. Serial No. 525,315.

*To all whom it may concern:*

Be it known that I, FRANK E. BEST, a citizen of the United States, residing at Seattle, in the county of King and State of Washington, have invented a new and useful Parachute and Means for Launching Same, of which the following is a specification.

This invention relates to parachutes, and more particularly to a method and means for launching parachutes from an airship, aeroplane, or the like, and other means whereby one's impact with the ground when landing from the parachute will be reduced to a minimum and danger of injury eliminated.

It is the principal object of this invention to provide means whereby parachutes, such as may be used on aeroplanes, in balloons, or airships of various types, and which are to be kept in readiness in a specially arranged pack, may be launched, or extended, in such manner that the usual fall or drop necessary for successful opening is not needed and safe landings may be made from very low elevations.

Another object of the invention is to provide means whereby the passenger, or aviator, descending in the parachute may cause his landing impact to be reduced to a minimum and all possible danger from landing eliminated.

More specifically, it is the object of the invention to provide means for launching a parachute into the air before the one who is to descend in it has jumped off, and whereby the launching of the parachute will extend, and lock in extended position, a certain resilient supporting means which may be released by the one descending just prior to his landing so that contraction of this resilient support will retard his fall to such an extent that his impact with the ground is substantially lessened and he will be landed in safety.

Other objects of the invention reside in the details of construction of the various parts, and in their combination and method of operation, whereby the above results are made possible.

In accomplishing these and other objects of the invention, I have provided the improved details of construction, the preferred forms of which are illustrated in the accompanying drawings, wherein—

Fig. 1 is a view illustrating the principle of operation of the landing mechanism; one view showing the resilient support extended and the other view showing it contracted.

Fig. 2 is a perspective view of the clutch housing from which the support or seat whereon the passenger rides is suspended.

Fig. 3 is a sectional view of the housing of Figure 2, showing the clutch mechanism interiorly thereof whereby the housing is locked against movement on the suspending rod.

Fig. 4 is a sectional view of a gun for launching the parachute, showing a projectile within the gun, and its connection with the parachute; the latter being arranged in a pack.

Fig. 5 is an enlarged view of the suspending means whereby the seat in which the passenger descends is connected with the parachute.

Fig. 6 is an illustration showing the method whereby the parachute is extended, or launched.

Referring more in detail to the drawings—

1 designates a parachute body and 2 the ropes which have their upper ends attached to its periphery and their lower ends, all fixed within a block 3 from which the occupant, that is; the one descending in the parachute, is supported.

Fixed at one end within the block 3, is a substantially rigid rod 4 of considerable length, and which depends in a perpendicular manner when one is descending in the parachute. Coiled about this rod are several springs 5, as shown best in Figure 5. These are contained one within the other and are capable of being stretched to considerable length along the rod 4 and are fixed at their upper ends within the block 3 and at their lower ends, are all connected with a laterally turned flange 6 formed at the upper end of a clutch housing 7 through which the rod 4 extends; the housing 7 being slidable along the rod and is also fitted within an outer, shiftable casing 8 which, as presently described, may be actuated by the rider to lock, or release the clutch mechanism within the housing 7 from the rod 4.

Overlying the flange 6 is a plate 9 having a plurality of downwardly turned wings 10 to which are attached the upper ends of cables, or rods, 11, as shown in Figure 5; these cables are the supporting means for a seat, or other device, upon which the passenger is carried while descending.

The housing 7 is provided at its upper and lower ends with openings, as at 12, through which the rod 4 passes, and also with openings 13 through which the opposite ends of a clutch control bar 14 are slidably extended; the said bar 14 being disposed in spaced relation to, and parallel with the rod 4, and is provided on the side adjacent the said rod with converging, outwardly inclined surfaces 15—15' along which a clutch roller 16 is adapted to move in such manner that, when rolling outwardly along these surfaces, it will wedge itself against the rod 4 and thereby act as a clutch means to prevent movement of the housing along the rod. Should the roller be disposed adjacent the point of convergence of the inclined surfaces, it will not grip the rod and the housing will be freely movable, but should the bar 14 be shifted so that the roller will be wedged between the rod 4 and the surface 15, the housing will be prevented from being drawn downwardly, and if wedged against the surface 15', it will likewise be held against upward movement under the influence of springs 5.

The roller 16 is supported operatively in position between the inner ends of two coiled springs 17—17', as shown in Fig. 3, located within the housing at opposite sides of the roller.

The casing 8 incloses the housing 7 and is slidable thereover and the opposite ends of the latch bar 14 are abutted against the upper and lower walls of the casing 8, so that movement of this casing upwardly or downwardly effects a like movement of the bar 14 which controls the releasing, or locking, of the clutch mechanism. While the parachute is not in use, that is, before it has been launched, the latch bar is disposed in a neutral position so that the roller 16 is released from the rod 4 and the housing 7 is freely movable along the rod 4.

A yieldable spring arm 18 is formed on the back side of the housing 7, and this has an inturned end portion 19 bearing against the back surface of the bar 14. The bar has a projection 20 which is movable under the end of this arm and to opposite sides thereof, so that the bar is yieldably held thereby at set positions.

In using a parachute of this type on an aeroplane or airship, it is kept in readiness in a pack, as designated at 22 in Figure 4, and this pack is placed upon a wing, as designated at 23, or other desirable part of the machine. As a means of launching the parachute into the air, I have provided a gun 25, the barrel of which is fixed within the wing, and is loaded with any suitable explosive 26 to discharge a projectile 27 which is located in the end of the barrel and by means of a cable 28, is attached to the vertex of the parachute body. The gun is discharged by the striking of a spring pressed hammer against a detonating cap 29. The hammer is released by pressure by the operator on a trigger 30.

Assuming that the parachute is so constructed and is mounted in a pack upon the wing of an aeroplane, as shown, and that the occupant of the plane wishes to descend in the parachute, he would first position himself in the seat suspended from the parachute and, when in readiness, would fire the gun which would discharge the projectile upwardly into the air; the projectile, by its connection with the parachute, would draw the latter from the pack and carry it to an extended position as shown in Figure 6. The operator would then jump off.

It is apparent that the force of the projectile carrying the parachute upwardly would also cause the springs 5 to be greatly extended under the weight of the operator, and that, when they are in this extended position, shifting of the casing 8 upwardly will likewise shift the clutch control rod 14 so that the roller 16 will be wedged between the clutch surface 15' and the rod 4 to prevent retraction of the springs. If the force of the projectile should not be sufficient to extend the springs, it is apparent that this will be accomplished when the parachute opens. Just prior to the moment the passenger reaches the ground he may shift the casing 8 to position to release the clutch mechanism. This will permit the springs to retract and, in doing so, will draw the means on which he is suspended upwardly so that he is thereby momentarily stationary in the air and the momentum of his fall is broken, so that the landing impact is lessened to such an extent that there is no danger.

Having thus described my invention, what I claim as new therein and desire to secure by Letters Patent, is:

1. The combination with a parachute, of resilient suspension means arranged to be extended when said parachute is launched and capable of lifting the weight of a passenger, and releasable means for retaining said resilient suspension means in an extended position.

2. In a parachute of the class described comprising a cover with ropes, fixed at their upper ends to the periphery of the cover and at their lower ends fixed to a central block, a rigid member fixed at its upper end within the block, a member slidable along the rod, a carriage suspended from the sliding member, a resilient connecting means fixed to the block and to the sliding member and means whereby the latter may be locked against movement along the rod.

3. In a parachute of the class described comprising a cover and ropes, fixed at their upper ends to the cover, and at their lower ends to a central block, a rod suspended from the block, a clutch housing slidable along the rod, a carriage suspended from the clutch housing, a resilient connection fixed to the block and to the housing, a clutch within the housing operable to lock the housing against movement along the rod, and means adapted to be operated by the passenger in the carriage to actuate the clutch to and from locking relation with the rod.

4. In a parachute of the class described comprising a cover and ropes, fixed at their upper ends to the periphery of the cover, and at their lower ends to a block common to all, a rod having its upper end fixed in the block, a clutch housing slidable along the rod, a clutch mechanism within the housing whereby the latter may be locked against movement along the rod, a carriage suspended from the housing, a casing slidable in opposite directions on the housing for actuating the clutch mechanism to lock the housing against movement in opposite directions on the rod, springs coiled about the rod and fixed at their upper ends to the block and at their lower ends to the clutch housing; said springs being adapted to be stretched out by the launching of the parachute and to be retained in stretched position by said engagement of the clutch with the rod, and to retract when the clutch is released, for the purpose set forth.

5. In a parachute of the class described comprising a cover portion, and ropes fixed at their upper ends to the periphery of the cover and at their lower ends to a central block; a rod fixed to the block and depending therefrom, a clutch housing slidable on the rod, having a laterally turned flange, springs coiled about the rod, fixed at their upper ends to the block and at their lower ends to the said housing flange, a carriage suspended from the clutch housing, a clutch bar slidable through the housing having converging, inclined surfaces, a roller operable along said surfaces to wedge against the rod to lock the housing against movement in opposite directions, a casing fitted over the housing and movable in opposite directions to actuate the clutch bar in opposite directions to release the clutch mechanism and to lock the housing against movement in opposite directions.

6. A device as in claim 4, wherein there is yieldable means for retaining the clutch bar in different set positions.

Signed at Seattle, Washington, this 22 day of December, 1921.

FRANK E. BEST.